US011381010B2

(12) United States Patent
Brenca et al.

(10) Patent No.: US 11,381,010 B2
(45) Date of Patent: Jul. 5, 2022

(54) CONNECTION DEVICE

(71) Applicant: Tyco Electronics France SAS, Pontoise (FR)

(72) Inventors: Veronique Brenca, Pontoise (FR); Xavier Rouillard, Pontoise (FR); Joseph Daher, Pontoise (FR)

(73) Assignee: Tyco Electronics France SAS, Pontoise (FR)

( * ) Notice: Subject to any disclaimer, the term of this patent is extended or adjusted under 35 U.S.C. 154(b) by 0 days.

(21) Appl. No.: 17/122,600

(22) Filed: Dec. 15, 2020

(65) Prior Publication Data

US 2021/0194156 A1 Jun. 24, 2021

(30) Foreign Application Priority Data

Dec. 18, 2019 (FR) ...................................... 1914721

(51) Int. Cl.
*G06K 13/08* (2006.01)
*H01R 4/28* (2006.01)
*H01R 43/027* (2006.01)

(52) U.S. Cl.
CPC ............. *H01R 4/28* (2013.01); *H01R 43/027* (2013.01)

(58) Field of Classification Search
CPC .......... H01R 23/7005; H01R 13/62938; H01R 13/62955; H01R 13/62933
USPC ........................................ 439/159, 160, 372
See application file for complete search history.

(56) References Cited

U.S. PATENT DOCUMENTS

| | | | | |
|---|---|---|---|---|
| 4,938,713 | A | 7/1990 | Daly et al. | |
| 9,843,132 | B2 | 12/2017 | Ludwig | |
| 9,948,026 | B2 | 4/2018 | Mathews et al. | |
| 2012/0071015 | A1* | 3/2012 | Debock ............. | H01R 13/6461 439/271 |

OTHER PUBLICATIONS

European Patent Office, dated Apr. 12, 2021, 9 pages.

* cited by examiner

*Primary Examiner* — Phuong Chi Thi Nguyen
(74) *Attorney, Agent, or Firm* — Barley Snyder

(57) ABSTRACT

A connection device electrically connects a textile to an electrical contact of a connector. The connection device is received in an insertion direction in the connector. The connection device includes a body and an attachment device. The body has a first end and a second end opposite the first end in the insertion direction. The body has a first surface extending between the first end and the second end and a second surface opposite to the first surface. The body has a portion at the first end extending essentially transversely from the first surface, the portion having an aperture into which the textile is inserted. The attachment device for the textile is connected to the second surface at the first end.

13 Claims, 4 Drawing Sheets

CONNECTION DEVICE

CROSS-REFERENCE TO RELATED APPLICATION

This application claims the benefit of the filing date under 35 U.S.C. § 119(a)-(d) of French Patent Application No. 1914721, filed on Dec. 18, 2019.

FIELD OF THE INVENTION

The present invention relates to a connection device and, more particularly, to a connection device for electrically connecting a textile or a flexible material to at least one electrical contact of a connector.

BACKGROUND

The use of textiles or flexible materials comprising electrically conductive fibers, such as a silver coating, is known in order to heat a vehicle's interior. This type of textile or flexible material can also comprise graphite in order to further improve diffusion of the heat. These textiles or flexible materials are in particular disposed under a covering of the vehicle, for example the seats, the roof light, or the glove compartment. The use of textiles or flexible materials of this type provides for more rapid heating than that provided by the ventilation system of the vehicle's interior. This type of resistance heating provides immediate heating and, furthermore, can be used to reduce the energy consumption necessary to heat the vehicle's interior.

Textiles or flexible materials of this type are usually connected to electrical connectors provided with terminals and electrical contacts by crimping in order to produce an electrical connection with a power supply. However, it has been observed that crimping can damage the textile or the flexible material and thus deteriorate its properties, in particular its conductive properties. Crimping can also cause the textile or the flexible material to tear.

SUMMARY

A connection device electrically connects a textile to an electrical contact of a connector. The connection device is received in an insertion direction in the connector. The connection device includes a body and an attachment device. The body has a first end and a second end opposite the first end in the insertion direction. The body has a first surface extending between the first end and the second end and a second surface opposite to the first surface. The body has a portion at the first end extending essentially transversely from the first surface, the portion having an aperture into which the textile is inserted. The attachment device for the textile is connected to the second surface at the first end.

BRIEF DESCRIPTION OF THE DRAWINGS

The invention will now be described by way of example with reference to the accompanying Figures, of which.

DETAILED DESCRIPTION OF THE EMBODIMENT(S)

The invention will now be described in more detail using advantageous embodiments by way of example and with reference to the drawings. The embodiments described are simply possible configurations and it should be borne in mind that the individual features as described above may be provided independently of each other or may be omitted completely when implementing the present invention.

Figure 1A:
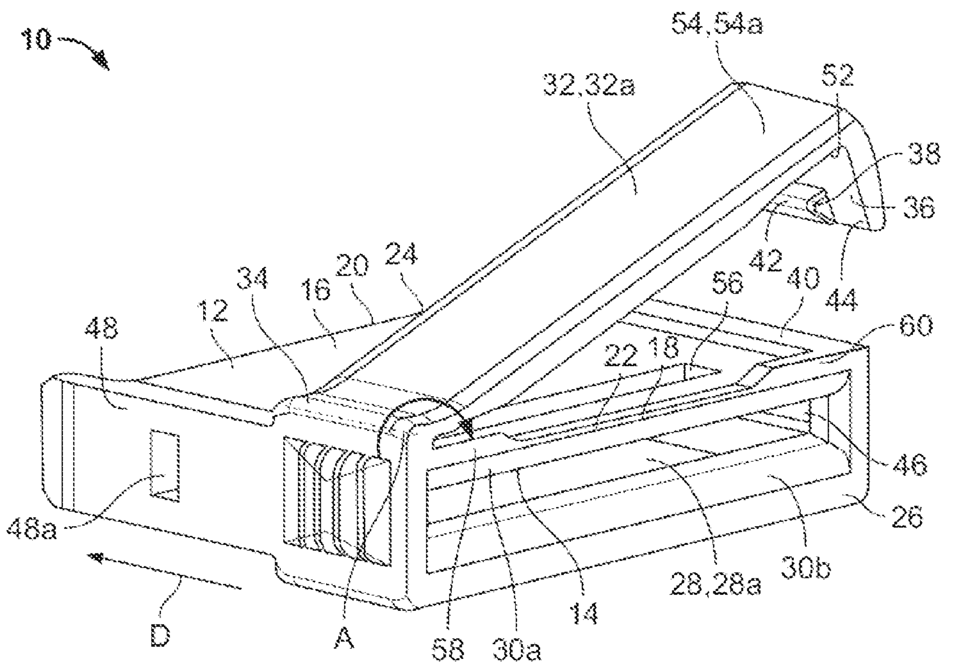
FIG. 1*a* is a perspective view of a connection device according to an embodiment.
Figure 1B:
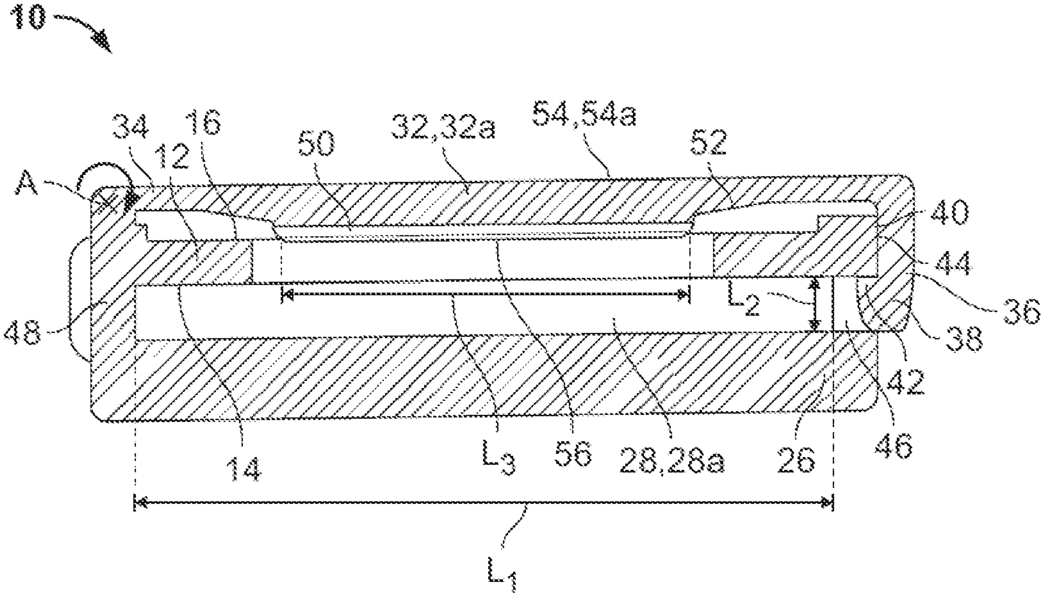
FIG. 1*b* is a sectional side view of the connection device of FIG. 1*a;*

A connection device 10 according to an embodiment is shown in an unlocked position in FIG. 1*a* and a locked position in FIG. 1*b*. The connection device 10 is a device adapted for electrically connecting a textile to at least one electrical contact of a connector. The connection device 10 is configured so as to be received in a connector (not shown in FIGS. 1*a* and 1*b*; see FIGS. 4*a* and 4*b*) in an insertion direction D.

The connection device 10, as shown in FIGS. 1*a* and 1*b*, includes a body 12 in the form of a flat plate having a first surface 14 and a second surface 16 opposite to the first surface 14. The first surface 14 and the second surface 16 of the body 12 are surfaces which are essentially flat and parallel to each other. The body 12 of the connection device 10 has a first end 18 and a second end 20 opposite to the first end 18 in the insertion direction D. The first end 18 corresponds to a first edge 22 of the body 12, while the second end 20 corresponds to a second edge 24, opposite to and parallel to the first edge 22.

At the first end 18, the body 12 has a portion 26 which extends essentially transversely from the first surface 14 of the body 12, as shown in FIGS. 1*a* and 1*b*. The portion 26 has an aperture 28 which corresponds to a substantially rectangular opening 28*a* in the portion 26 and the length L1 extends parallel to the first edge 22 of the body 12. The length L1 and the width L2 of the aperture 28 have dimensions which are suitable for a textile to be inserted into the aperture 28. Each of the edges 30*a*, 30*b* of the length L1 of the aperture 28 is rounded in order to avoid the presence of sharp edges which could cut or damage the textile inserted into the interior of the aperture 28 (the textile is not shown in FIGS. 1*a* and 1*b*; see FIGS. 3*a* to 3*c*).

At the first end 18, the second surface 16 has an attachment device 32 for attaching the textile, as shown in FIGS. 1*a* and 1*b*. In the first embodiment, the attachment device 32 is a hinge 32*a* in the shape of an "L", wherein a first end 34 is fastened to the body 12 in a manner which is pivotable about an axis of rotation A. In the first embodiment, the attachment device 32 is integrally formed with the connection device 10.

The attachment device 32 has a second end 36 which is free, provided with a snap fitting device 38 for snap fitting with a lateral edge 40 of the connection device 12, as shown in FIGS. 1*a* and 1*b*. The lateral edge 40 extends in a manner which is perpendicular to the first edge 22 and to the second edge 24. A free end 36 of the snap fitting device 38 has a protuberance 42 which protrudes from an internal surface 44 orientated towards the internal angle of the "L" shape of the attachment device 32. The lateral edge 40 has an opening 46 with dimensions such as to receive the protuberance 42 of the snap fitting device 38.

As can be seen in FIG. 1*b*, the attachment device 32 may be held in a locked position by snap fitting on the connection device 10, via the recess for the protuberance 42 of the snap fitting device 38 in the opening 46 of the lateral edge 40.

The body 12 of the connection device 10 has a second lateral edge 48, which is parallel to the lateral edge 40, and to which the first end 34 of the attachment device 32 is fastened. Each of the lateral edge 40 and the lateral edge 48 respectively has an opening 40*a*, 48*a* (the opening 40*a* is not visible in FIG. 1*a*) which is adapted to receive a locking device of a connector in a position of the connection device 10 which is said to be assembled with the connector. The technical effect of the openings 40*a*, 48*a* in the lateral edges 40, 48 of the connection device 10 will be described further with reference to FIG. 4*b*.

The attachment device 32 has a tongue 50 (only visible in FIG. 1*b*) which protrudes transversally from an internal surface 52 of the attachment device 32. The internal surface 52 at the level of the tongue 50 is provided so that it will come to bear against a textile when the attachment device 32 is in the locked position, as illustrated in FIG. 1*b*. The internal surface 52 is thus opposite to an external surface 54 of the attachment device 32 which acts as a gripping surface 54*a* for an operator for closing and snap fitting the attachment device 32 into the locked position. The tongue 50 has a length L3 which, in the locked position of the attachment device 32, is substantially parallel to the length L1 of the aperture 28.

The second surface 16 of the body 12 has a groove 56 at the first end 18, as shown in FIGS. 1*a* and 1*b*. The shape of the groove 56 is essentially complementary to the tongue 50 of the attachment device 32.

The tongue 50 of the attachment device 32 and the groove 56 can be used to further compress the textile on the connection device 10 in the locked position and thus improve the hold on the textile. The technical effect of the tongue 50 will be detailed further with reference to FIG. 4*a*. It should be noted that the shape and the geometry of the tongue 50 and of the complementary groove 56 are not limited to those illustrated in FIGS. 1*a* and 1*b*.

Two abutment elements 58, 60 for a textile protrude from the second surface 16 of the body 12 and partially extend along the first edge 22, as shown in FIG. 1*a*.

Figure 2A:
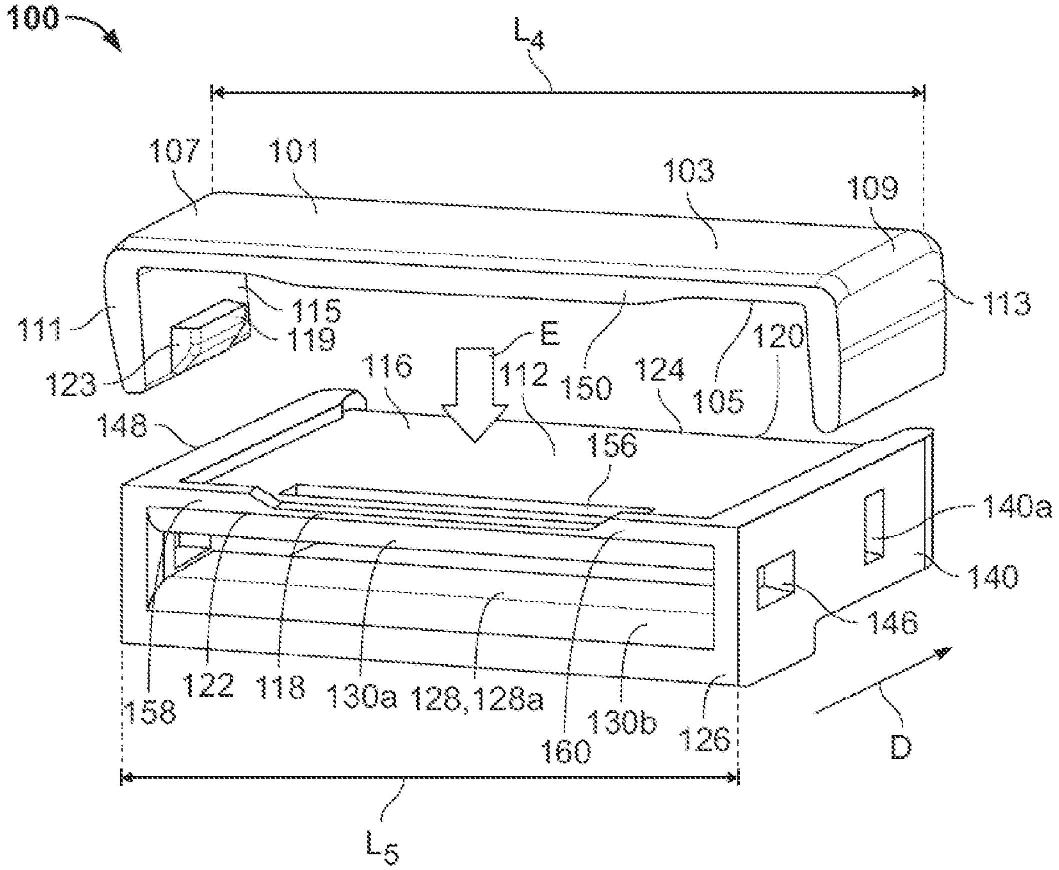
FIG. 2*a* is a perspective view of a connection device according to another embodiment.
Figure 2B:
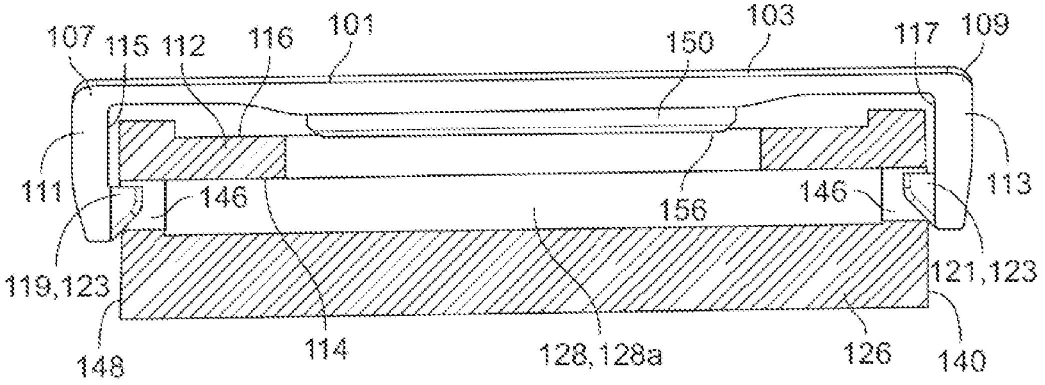
FIG. 2*b* is a sectional side view of the connection device of FIG. 2*a;*

FIG. 2*a* represents a diagrammatic view of a connection device 100, in an unlocked position in accordance with a second embodiment. FIG. 2*b* represents a sectional view of the same connection device 100, in a locked position. The elements of the connection device 100 in common with those of the connection device 10 are indicated by reference numerals with the same tens references as those used in FIGS. 1*a* and 1*b*. Thus, elements with the same tens in the numerical references which have already been used for the description of FIGS. 1*a* and 1*b* will not be described again in detail, and reference should be made to their descriptions above.

The connection device 100 differs from the connection device 10 in the attachment device. The connection device 100 in accordance with the second embodiment comprises an attachment device 101 which is a detachable element. Thus, as a difference from the attachment device 32 in accordance with the first embodiment, the attachment device 101 is not constituted by a hinge 32*a* which is secured to the body 12,112.

As shown in FIGS. 2*a* and 2*b*, the attachment device 101 is substantially in the shape of a "U", wherein the length L4 of the central portion 103 corresponds to the length L5 of the first edge 122 of the body 112. An internal surface 105 of the central portion 103 is provided for the tongue 150, which latter is adapted to be housed in the groove 156 of the body 112 of the connection device 100 in the locked position, as can be seen in FIG. 2*b*.

At a first end 107 and at a second end 109 of the central portion 103, a respective wall 111, 113 protrudes from the internal surface 105 in a manner such as to provide the attachment device 101 with a "U" shape, as shown in FIGS. 2*a* and 2*b*. Each of the walls 111, 113 has an internal surface 115, 117 from which a protuberance 119, 121 protrudes. The protuberances 119,121 constitute the snap fitting device 123 of the attachment device 101.

The attachment device 101 is provided so that it can be clipped to the body 112 in accordance with a snap fitting direction E (see the arrow E in FIG. 2*a*). As can be seen in FIG. 2*b*, the attachment device 101 may be held in a locked position by snap fitting to the connection device 100; the protuberances 119, 121 of the snap fitting device 123 engage in the corresponding openings 146 of the lateral edges 140, 148.

Figure 3A:
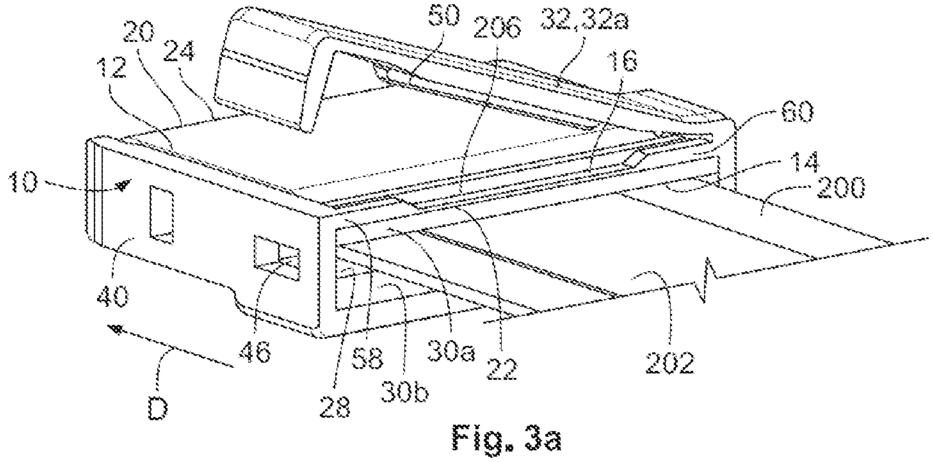
FIG. 3*a* is a perspective view of a textile and the connection device of FIG. 1*a*, with an attachment device of the connection device in an open position.
Figure 3B:
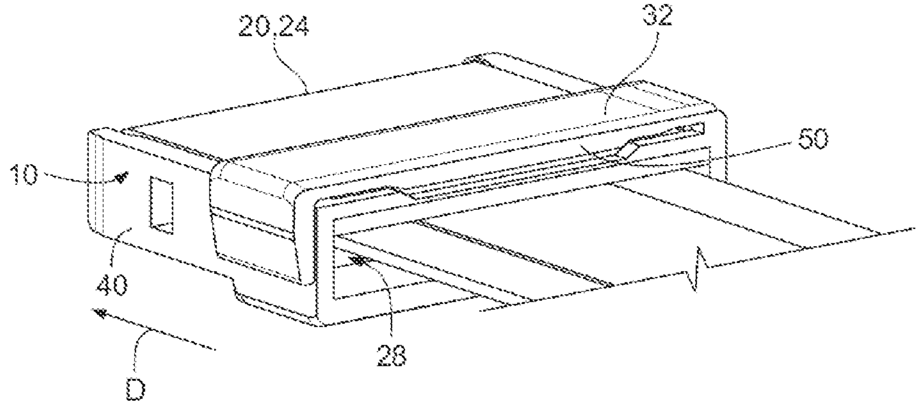
FIG. 3*b* is a rear perspective view of the textile and the connection device of FIG. 1*a*, with the attachment device in a closed position.
Figure 3C:
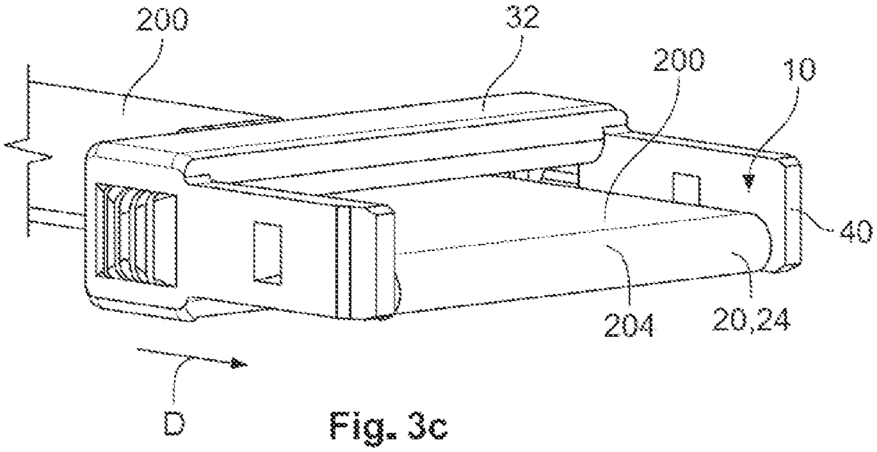
FIG. 3*c* is a front perspective view of the textile and the connection device of FIG. 1*a*, with the attachment device in the closed position.

FIGS. 3*a*-3*c* represent successive steps in assembling a textile with a connection device 10 in accordance with the first embodiment. The elements with the same numerical reference numbers already used for the description of FIGS. 1*a* and 1*b* will not be described again in detail, and reference should be made to their descriptions above.

FIG. 3*a* represents the connection device 10 in the unlocked position, i.e. the snap fitting device 38 (which is not visible in FIG. 3*a*) has not yet been clipped into the opening 46 of the lateral edge 40 of the connection device 10. The hinge 32*a* of the attachment device 32 is thus in an open position in FIG. 3*a*.

FIG. 3*a* furthermore illustrates a textile 200, in this case a fabric comprising an electrically conductive strip 202. As an example, the strip 202 may be constituted by silver filaments. The connection device 10 is configured in order to hold the textile 200 for an electrical connection with a connector (not shown in FIGS. 3*a* to 3*c*; see FIGS. 5*a* and 5*b*). To this end, the textile 200 is introduced in the insertion direction D via the aperture 28 of the connection device 10. The first surface 14 of the body 12 is then covered by the textile 200.

The textile 200 is pulled in the insertion direction D then turned over at the second end 20, over the second edge 24 of the body 12. A fold 204 (which can be seen best in FIG. 3*c*) is thus formed in the textile 200 at the level of the second edge 24 of the body 12. Thus, in addition to the first surface 14, the textile 200 then also covers the second surface 16 of the body 12. The textile 200 is pulled in the opposite direction to the insertion direction D until one end 206 of the textile 200 comes into abutment against the abutment elements 58, 60 disposed along the first edge 22. The person skilled in the art will understand that the selection of the orientation of the textile 200 when it is being inserted into the connection device 10 is a function of the structure and the properties of the textile 200 itself.

It should be noted that, as illustrated in FIG. 3*a*, the edges 30*a*, 30*b* of the aperture 28 are rounded in a manner such as to avoid the presence of sharp edges which could cut or damage the textile 200 inserted inside it.

FIGS. 3*b* and 3*c* represent the connection device 10 in the locked position, i.e. when the snap fitting device 38 (which is not visible in FIGS. 3*b* and 3*c*) is clipped into the opening 46 of the lateral edge 40 of the connection device 10. The hinge 32*a* of the attachment device 32 is thus in a closed position in FIGS. 3*b* and 3*c*.

In the locked position shown in FIGS. 3*b* and 3*c*, the textile 200 is held by the attachment device 32, which is attached to the lateral edge 40. In addition, the textile 200 is compressed between the tongue 50 of the attachment device 32 and the groove 56 of the second surface 16. Thus, the textile 200 can be efficiently retained without the need for a step for crimping, which could damage it. In addition, the fold 204 of the textile 200 at the level of the second edge 24 can be used to reduce forces in the event of stress on the fabric, in particular in the event of tensile stress in a direction opposite to the insertion direction D.

In a variation, the body 12 may be provided with a transverse opening between the first surface 14 and the second surface 16, in a manner such that the textile 200 which can be introduced into it is folded in order to be turned back to the abutment elements 58 and 60, in the same manner as that explained above. The fold 204 of the textile 200 will then be disposed at the level of an internal edge of such an opening and no longer at the level of the free end 20 along the second edge 24.

It should be noted that the steps described above for holding the textile 200 in the connection device 10 apply in the same manner to the connection device 100 in accordance with the second embodiment, with the exception of the closure of the attachment device. In fact, while in the case of the device 10, the hinge 32*a* is pivoted about the axis A into the locked position, the attachment device 101 in accordance with the second embodiment is positioned and clipped to the lateral edges 140, 148 of the device 100 in the snap fitting direction E.

Figure 4A:
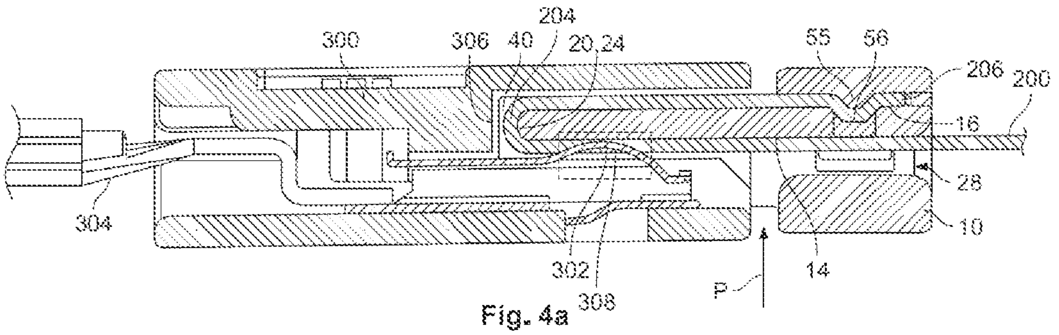
FIG. 4*a* is a sectional side view of the textile, a connector, and the connection device of FIG. 1*a* in a locked position.
Figure 4B:
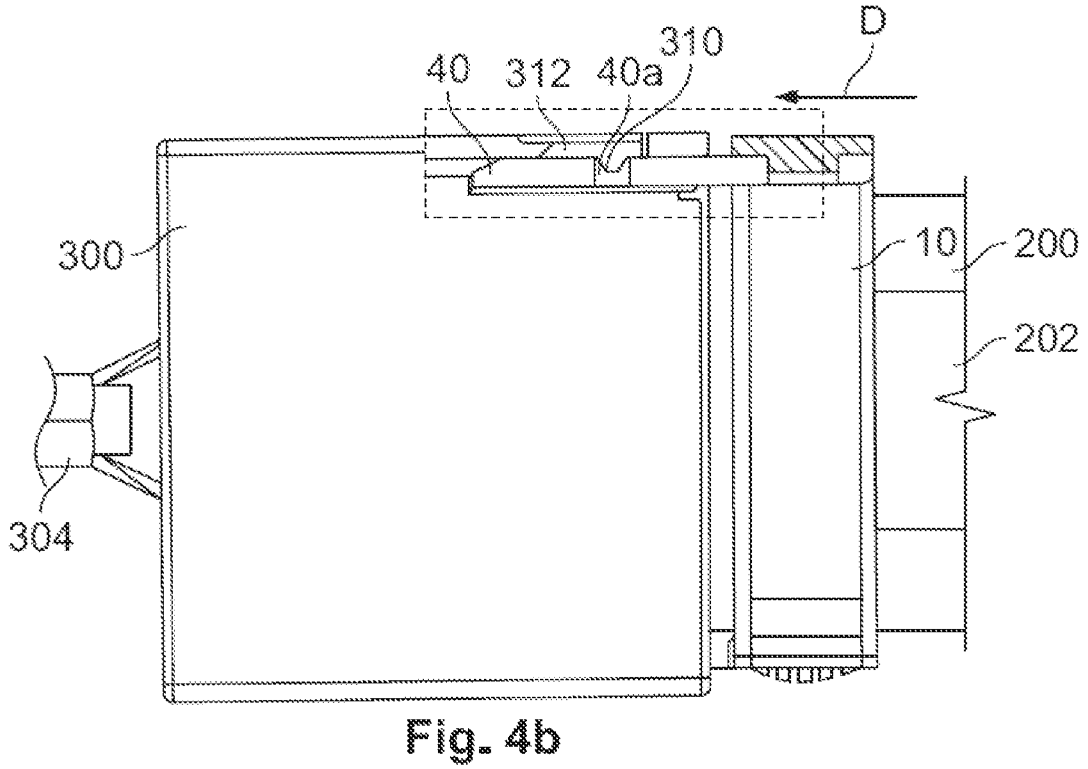
FIG. 4*b* is a top view of the textile, the connector, and the connection device of FIG. 1*a* in the locked position.

FIGS. 4*a* and 4*b* represent assembly of the connection device 10 and the textile 200 with a connector 300. The elements with the same reference numerals already used for the description of FIGS. 1*a*-1*b* and 3*a*-3*b* will not be described again in detail; reference should be made to their descriptions above.

FIG. 4*a* illustrates the connection device 10 in which the textile 200 is held and which is introduced into a connector 300. The connector 300 comprises electrical contacts 302 (a single contact 302 is visible in the sectional view of FIG. 4*a*), which are in turn connected to a terminal 304.

The connection device 10 as illustrated in FIGS. 3*b*, 3*c* has been introduced into the connector 300 in the insertion direction D up to the abutment of the lateral edges 40, 48 of the body 12 on an internal wall 306 of the connector 300. In this assembled position of the connection device 10 with the connector 300, a curved portion 308 of the electrical contact 302, as illustrated in the dashed line zone of FIG. 4*a*, exerts a pressure in a transverse direction P against the first surface 14 of the body 12, which is covered by the textile 200. Thus, the textile 200 is compressed against the first surface 14 by the curved portion 308 of the electrical contact 302, ensuring electrical contact between the textile 200 and the connector 300.

FIG. 4*a* can also be used to illustrate the compression of the textile 200 at the level of its end 206 between the tongue 50 of the attachment device 32 and the groove 56 of the second surface 16. The tongue 50 and the complementary groove 56 features mean that the hold of the textile 200 in the connection device 10 is further improved, without however damaging the textile 200, as could be the case, for example, with known crimping methods. Regarding the fold 204 of the textile 200 at the level of the second edge 24, this can enable forces to be reduced in the event of stress on the fabric, in particular in the event of tensile stress in a direction opposite to the insertion direction D.

The zone in dashed lines in FIG. 4*b* corresponds to a see-through view and illustrates the lateral edge 40 of the connection device 10. In the assembled position, the head 310 of a locking latch 312 is housed in the opening 40*a* of the lateral edge 40, thus allowing the connection device 10 to be easily locked on the connector 300 without the need for tools or complicated assembly steps.

The description of the assembled position made with reference to FIGS. 4*a* and 4*b* applies in the same manner to the connection device 100 in accordance with the second embodiment.

A method for attaching the textile 200 to the connection device 10 comprises the steps of: a) introducing one end 206 of the textile 200 through the aperture 28 and pulling it up to the second end 20; b) folding the textile 200 at the level of the second end 20 in order to turn it over towards the second surface 16; c) pulling the end 206 of the textile 200 up to the attachment device 32, d) attaching the textile 200 to the connection device 10 with the attachment device 32.

The fold in the textile 200 allows decreasing the tensile stresses in the event of stress on the textile 200, while the attachment device 32 can be used to hold the textile 200. For this reason, the present method can be used without crimping by providing a simple and reliable method for holding the textile 200 without damaging it, in order to be able to produce an electrical connection with a corresponding connector.

The embodiments described are simply possible configurations and it should be borne in mind that the individual characteristics of the embodiments may be combined together or provided independently of each other. In addition, the illustrated geometry and the shapes of the connection device may be varied without departing from the scope of the invention as defined in the accompanying claims.

What is claimed is:

1. A connection device for electrically connecting a textile to an electrical contact of a connector, the connection device received in an insertion direction in the connector, comprising:

a body having a first end and a second end opposite the first end in the insertion direction, the body having a first surface extending between the first end and the second end, and a second surface opposite to the first surface, the body having a portion at the first end extending essentially transversely from the first surface, the portion having an aperture into which the textile is inserted; and an attachment device for the textile connected to the second surface at the first end.

2. The connection device of claim 1, wherein the attachment device is a hinge pivotally connected to the body.

3. The connection device of claim 1, wherein the attachment device is a detachable element configured to be clipped to the body.

4. The connection device of claim 1, wherein the attachment device has a snap fitting device adapted to snap fit with an edge of the body.

5. The connection device of claim 1, wherein the first surface and the second surface are essentially flat and parallel to each other.

6. The connection device of claim 1, wherein the second end is a free end.

7. The connection device of claim 1, wherein a lateral edge of the body has an opening receiving a locking device of the connector in an assembled position in which the connection device is assembled with the connector.

8. The connection device of claim 1, wherein the aperture has a rounded edge.

9. The connection device of claim 1, wherein the attachment device has a tongue extending essentially transversely from a surface of the attachment device.

10. The connection device of claim 9, wherein the tongue bears against the textile.

11. The connection device of claim 10, wherein the second surface of the body has a groove at the first end.

12. The connection device of claim 11, wherein the groove has a shape complementary to the tongue.

13. A method for attaching a textile to a connection device, comprising:

providing a connection device including a body and an attachment device, the body having a first end and a second end opposite the first end in the insertion direction, the body having a first surface extending between the first end and the second end and a second surface opposite to the first surface, the body having a portion at the first end extending essentially transversely from the first surface, the portion having an aperture;

introducing an end of the textile through the aperture and pulling the end up to the second end of the body;

folding the textile at the second end to turn it over towards the second surface of the body;

pulling the end of the textile up to the attachment device; and attaching the textile to the connection device with the attachment device.

* * * * *